US009776792B1

(12) United States Patent
McCarter (10) Patent No.: US 9,776,792 B1
(45) Date of Patent: *Oct. 3, 2017

(54) VALVE SYSTEM (71) Applicant: James H. McCarter, Greenville, SC (US)

(72) Inventor: James H. McCarter, Greenville, SC (US)

( * ) Notice: Subject to any disclaimer, the term of this patent is extended or adjusted under 35 U.S.C. 154(b) by 328 days.

This patent is subject to a terminal disclaimer.

(21) Appl. No.: 14/257,330

(22) Filed: Apr. 21, 2014

Related U.S. Application Data (63) Continuation of application No. 13/232,404, filed on Sep. 14, 2011, now Pat. No. 8,701,553, which is a continuation-in-part of application No. 12/704,145, filed on Feb. 11, 2010, now Pat. No. 8,333,213.

(51) Int. Cl.
| | |
|---|---|
| *A47J 31/12* | (2006.01) |
| *F16K 13/10* | (2006.01) |
| *B65D 90/62* | (2006.01) |
| *F16K 41/04* | (2006.01) |
| *F16K 1/44* | (2006.01) |
| *F16K 1/42* | (2006.01) |

(52) U.S. Cl.
CPC ......... *B65D 90/623* (2013.01); *B65D 90/626* (2013.01); *F16K 41/043* (2013.01); *F16K 1/42* (2013.01); *F16K 1/44* (2013.01)

(58) Field of Classification Search
CPC .................................... F16K 1/42; F16K 1/44
USPC ............... 99/403, 422, 407, 275; 137/251.1, 137/329.01, 329.02, 329.05, 329.03, 137/329.04; 222/146.2, 146.5, 146.1
See application file for complete search history.

(56) References Cited

U.S. PATENT DOCUMENTS

| | | | | |
|---|---|---|---|---|
| 594,895 | A | * 12/1897 | O'Meara | F16K 1/42 137/329.02 |
| 805,677 | A | * 11/1905 | Smith | F16K 1/42 137/329.02 |
| 805,877 | A | * 11/1905 | Smith | C03B 23/0046 65/282 |
| 2,699,801 | A | 1/1955 | Schleyer | |

(Continued)

OTHER PUBLICATIONS

Notification of Transmittal of the International Search Report and the Written Opinion of the International Searching Authority, or the Declaration dated Nov. 16, 2012, for International Application No. PCT/USI2/054142.

*Primary Examiner* — Reginald L Alexander
(74) *Attorney, Agent, or Firm* — Smith Moore Leatherwood LLP; Thomas W. Epting (57) ABSTRACT

A valve system for a container or vat, such as a food cooking vat. The valve system includes a valve body and stem having a valve head with a sealing member. The valve body has an outlet configured to be in fluid communication with the vat, and the sealing member is in fluid communication with the outlet and the chamber and is selectively operable between a discharge position, allowing the vat's contents to drain from the chamber, and a closed position, allowing the contents to remain in the chamber. The sealing member preferably is comprised of polymer and has an O-type sealing ring interposed between a first portion and a second portion, where the diameter of the second portion is smaller than the diameter of the first portion. Embodiments may also include a snap-fit connection of the sealing member to the valve head.

4 Claims, 9 Drawing Sheets

(56) References Cited

U.S. PATENT DOCUMENTS

| | | |
|---|---|---|
| 2,707,378 A | 5/1955 | Ryan |
| 3,482,777 A | 12/1969 | Quinn |
| 3,552,421 A | 1/1971 | Yocum |
| 3,777,783 A | 12/1973 | Beck |
| 3,884,251 A | 5/1975 | Knight |
| 3,894,722 A | 7/1975 | Jones |
| 4,121,495 A | 10/1978 | Malo et al. |
| 4,614,859 A * | 9/1986 | Beckering ............... F24H 1/185 219/214 |
| 4,860,995 A | 8/1989 | Rogers |
| 4,872,481 A | 10/1989 | Shaw et al. |
| 4,923,173 A | 5/1990 | Szymaszek et al. |
| 4,941,503 A | 7/1990 | Hubner, Jr. |
| 5,160,117 A | 11/1992 | Besombes |
| 5,386,965 A | 2/1995 | Marchal |
| 6,065,493 A | 5/2000 | Friedman et al. |
| 6,641,112 B2 | 11/2003 | Antoff et al. |
| 6,832,750 B2 | 12/2004 | Nearpass |
| 6,874,484 B2 | 4/2005 | Benjey |
| 7,270,156 B2 | 9/2007 | Beesley et al. |
| 7,641,175 B1 | 1/2010 | Blume |
| 2002/0033465 A1 | 3/2002 | Mori et al. |
| 2003/0010953 A1 | 1/2003 | Coppock |
| 2005/0263187 A1 | 12/2005 | Jernigan et al. |
| 2008/0121666 A1 | 5/2008 | Purkins |
| 2009/0014678 A1 | 1/2009 | Durham |
| 2009/0188652 A1 | 7/2009 | Hart |

\* cited by examiner

VALVE SYSTEM

The present invention is directed towards a valve system and a seal for use in a valve system.

BACKGROUND

In certain applications there is a need for large containers of liquid or liquid-like of materials. One such application is in commercial food preparation processes. Other applications could include industrial and/or commercial processes for substances other than food.

For example, commercial and institutional food preparers may use large cooking containers or vats of food materials such as oils, sauces, brines, meats, vegetables, juices, or the like within which they will cook or otherwise prepare foodstuffs or consumables. Frequently, such food preparers must empty the container of the material once a batch is cooked or prepared. However, given the size of many of these containers, they do not lend themselves to being simply turned over and emptied, as one may do in a conventional kitchen.

Some containers may include a valve in the lower portion of the container which allows the material to be drained while the container remains stationary. However, these valves may include components that require servicing and/or replacement. One such valve is sold by Crown Food Service Equipment of Downsview, Ontario, Canada.

SUMMARY

Generally, the present invention includes numerous embodiments and configurations, one of which includes a valve assembly comprising a valve body and a stem assembly, wherein the stem assembly comprises a valve head with a sealing member, and wherein the sealing member comprises one or more polymers.

More specifically, the present invention may include, in one exemplary embodiment, a valve system for attachment to a container or vat, such as a food cooking vat. The valve system includes a valve body and stem, with the stem including a valve head having a sealing member connected thereto. The valve body has an outlet configured to be in fluid communication with the vat, and the sealing member is in fluid communication with the outlet and the chamber and is selectively operable between a discharge position, for allowing the food or other substance to drain from the chamber, and a closed position, for allowing the food or other substance to remain in the chamber. The sealing member preferably includes polymer and has a first portion of generally frusto-conical shape and a second portion of generally frusto-conical shape generally co-axial with the first portion. In another embodiment, the sealing member includes an O-type ring. In a further embodiment, the sealing member includes an O-type ring in addition to a first portion of generally frusto-conical shape and a second portion of generally frusto-conical shape generally co-axial with the first portion. In another embodiment, the sealing member may include a snap-fit connection to the valve head.

Numerous other aspects of embodiments, embodiments, features, and advantages of the present invention will appear from the following detailed description and the accompanying drawings. In the description and/or the accompanying drawings, reference is made to exemplary aspects of embodiments and/or embodiments of the invention which can be applied individually or combined in any way with each other. Such aspects of embodiments and/or embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. Also in the interest of brevity and conciseness, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of the present invention will become apparent from the following detailed description, the accompanying drawings, and the appended claims.

DETAILED DESCRIPTION

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Numerous other aspects of embodiments, embodiments, features, and advantages of the present invention will appear from the description and the accompanying drawings. In the description and/or the accompanying drawings, reference is made to exemplary aspects of embodiments and/or embodiments of the invention, which can be applied individually or combined in any way with each other. Such aspects of embodiments and/or embodiments do not represent the full scope of the invention.

Figure 1:
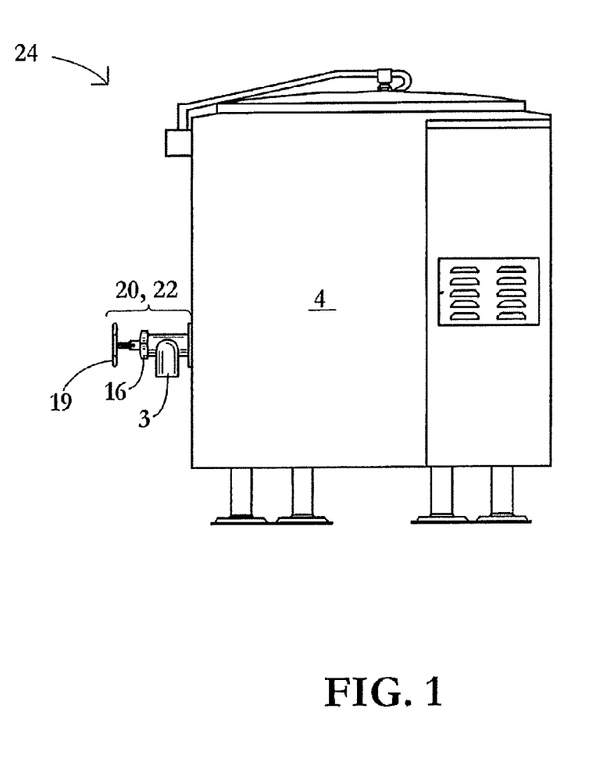
FIG. 1 is a view of a container or vat having one embodiment of a valve system constructed in accordance with the present invention.
Figure 9:
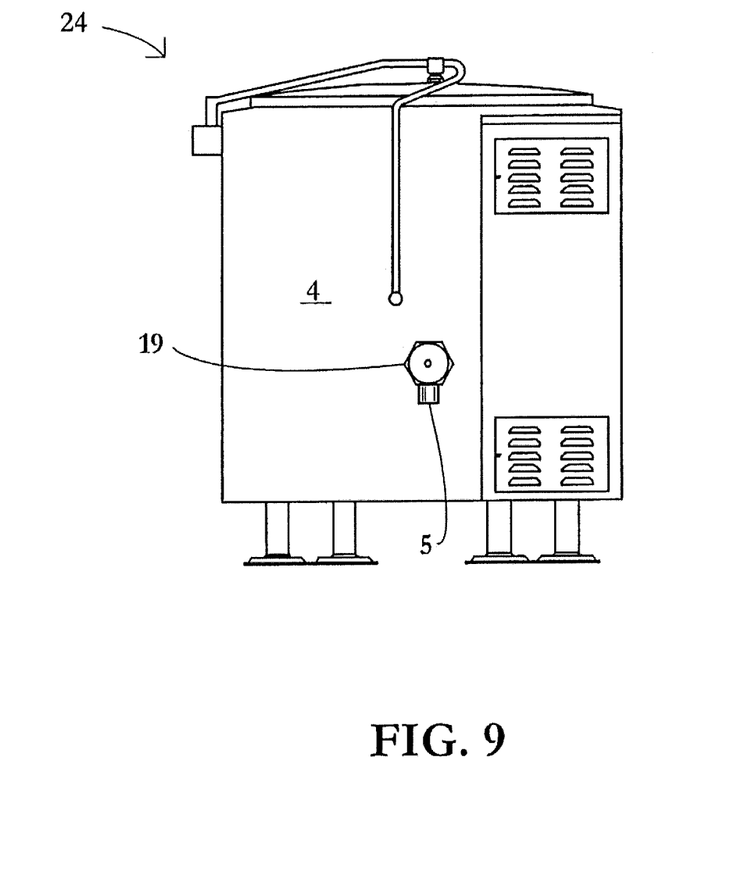
FIG. 9 is a side elevational view of a container having a valve system constructed in accordance with the present invention.

Turning now to the figures, FIGS. 1 and 9 show a vat or other container, generally 24, having a compartment or chamber for permanently or temporarily holding fluid material having on the exterior a valve assembly, generally 20, 22. Examples of such vats 24 include, but are not limited to, electric kettles, gas kettles, fryers, braising pans, other containers for holding large amounts of fluid material. The vat may have a holding area within a body portion 4 into which the fluid material is contained. The fluid material may include, but is not limited to, foods, drinks, industrial fluids, commercial fluids, and the like. The fluid material may be hot or cold or under high pressure, low pressure, or atmospheric pressure. The fluid material could also be in a vacuum.

Figure 2:
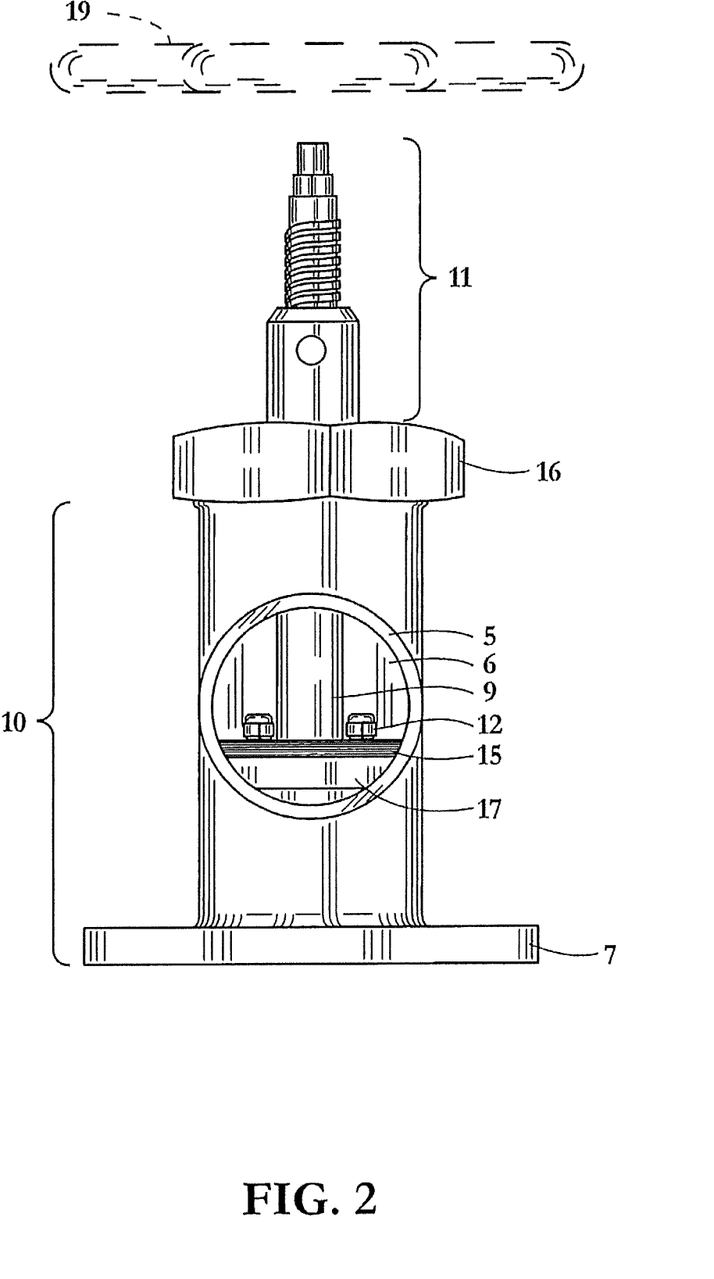
FIGS. 2 and 3 are side elevational views of embodiments of a valve system constructed in accordance with the present invention.
Figure 3:
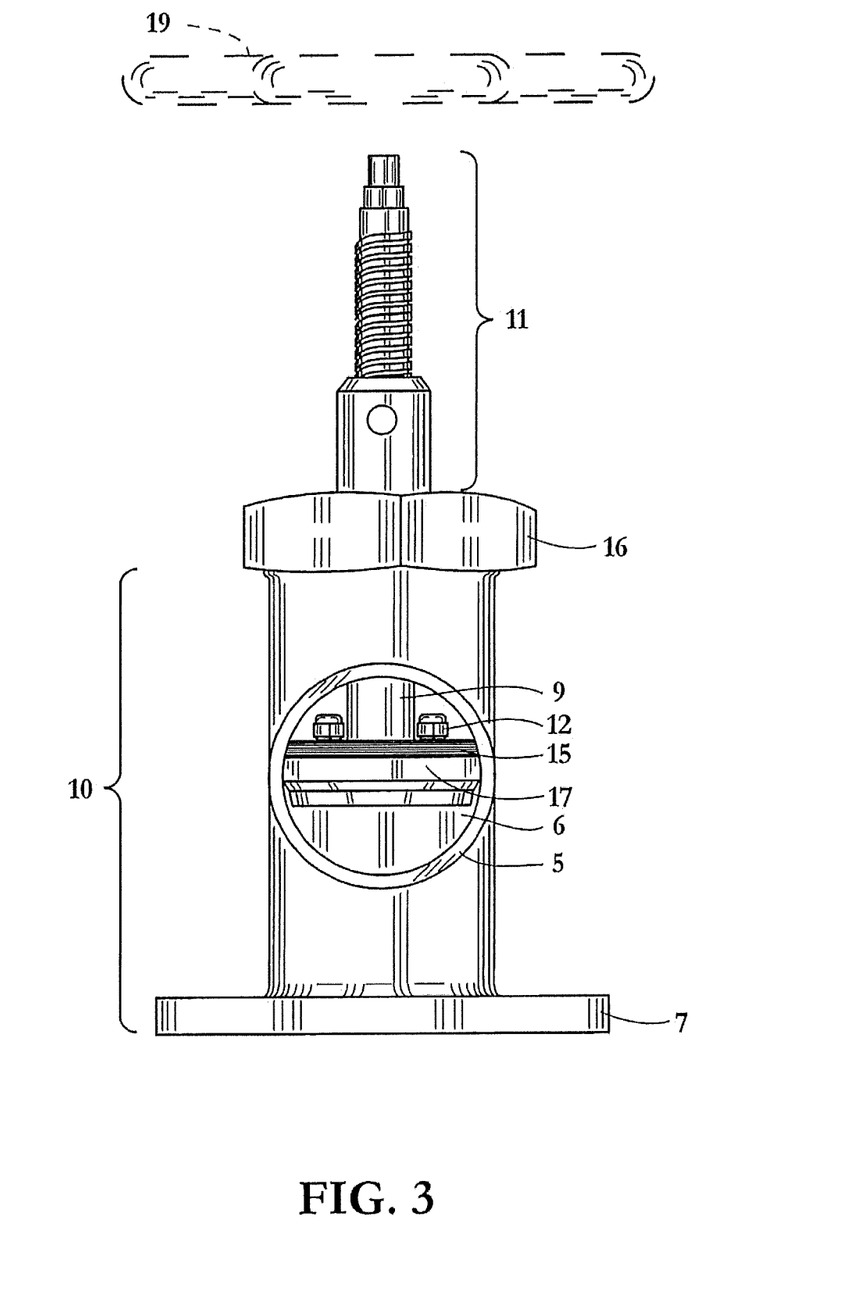

The valve system assembly 20, 22 is in communication with the interior of the holding area of body portion 4. The valve assembly 20, 22 and various components may be seen in more detail in FIGS. 2-8. As can be seen in FIGS. 2 and 3, the valve assembly 20, 22 has a valve body, generally 10, which may be in communication with the vat 24. The valve body 10 may be comprised of any material or combination of materials demonstrating the characteristics such as, but not limited to, the ability to withstand high and low temperatures, the ability to withstand high and low pressures, and resistance to the elements, necessary to the situation in which the valve assembly 20, 22 is used. Examples of such materials include, but are not limited to, metals, polymers, and combinations thereof where such metals and/or polymers may be substantially unreactive to the flowable material found within vat 24.

The valve body base 7 may be the point at which the valve body 10 is connected to the vat 24 through the use of means such as, but not limited to, welding, forging, molding, casting, bolting, or clasps; chemical means such as, but not limited to, adhesives; or combinations of the foregoing. The valve body 10 may be removably attached to the vat 24, or permanently attached to the vat 24.

The valve body 10 includes a valve body cavity 6. A stem assembly 11 may be situated inside the valve body cavity 6 such that the stem rod 9 extends into the valve body cavity 6 as shown in FIGS. 2 and 3. The stem rod 9 may be comprised of any material or combination of materials demonstrating the characteristics such as, but not limited to, ability to withstand high and low temperatures, ability to withstand high and low pressures, and resistance to the elements, necessary to the situation in which the valve assembly 20, 22 is used. Examples of such materials include, but are not limited to, metals, polymers, and combinations thereof.

The stem assembly 11 further includes a valve sealing assembly, or head, 13 (FIG. 5) at the end of the stem rod 9, which may be situated within the valve body cavity 6, as shown in FIGS. 2 and 3. The valve head 13 may be affixed to the stem rod 9 through the use of one or more valve connectors, generally 12. The valve connectors 12 may connect the valve head 13 to the stem rod 9 through the use of mechanical means such as, but not limited to, welding, bolts, screws, or other threaded fasteners, clips, and/or clasps or the like; chemical means such as, but not limited to, adhesives; or combinations thereof. If desired, the valve head 13 may be an extension of the end of the stem rod 9 such that the valve head 13 and the stem rod 9 are one piece, i.e., of integral construction.

The valve head 13 may include a valve head base 15 as shown in FIGS. 2 and 5-8. The valve head base 15 may be made of the material or materials comprising the stem rod 9, the material or materials comprising the sealing member 17 as discussed below, or any other such material or combination of materials demonstrating the characteristics necessary to the situation in which the valve assembly 20, 22 is used. Examples of such materials include, but are not limited to, metals, polymers, and combinations thereof. In one embodiment, the valve head base 15 may be an extension of the stem rod 9 such that the valve head base 15 and the stem rod 9 are one piece.

The valve head 13 includes a sealing member 17. The sealing member 17 is generally disc-shaped and may be made of polymers, any other such material or combination of materials demonstrating the characteristics necessary to the situation in which the sealing member 17 is used. The sealing member 17 includes, in one embodiment, a generally cylindrical portion 17a at the extreme, or free, end thereof and having a peripheral surface of an angled, or chamfered, configuration. A second generally cylindrical portion 17b is of larger diameter than the portion 17a and also includes an angled, or chamfered, portion which generally abuts and/or terminates into portion 17a. With this embodiment, the portion 17a functions as a primary seal for essentially plugging the outlet opening (not shown) in the valve body cavity 6 and portion 17b serves to engage a rim, or valve seat element, (not shown) encircling the outlet opening to provide additional sealing of the outlet opening. Examples of such materials include, but are not limited to, elastomers such as butyl elastomer; Teflon; nylon; polypropylene; polyethylene; polystyrene; neoprene; copolymers; or any combination thereof. Such materials and combinations thereof may be substantially unreactive to the flowable material found within the vat 24.

In one embodiment, the sealing member 17 could comprise a core of one or more materials such as described above and an outer layer or layers of one or more materials such as described above. In another embodiment, sealing member 17 could comprise a core of the same material or materials the stem rod 9 is comprised of and an outer layer or layers of one or more materials such as described above. In another embodiment, the core of the sealing member 17 may be an extension of the stem rod 9 (not shown) such that an outer layer or layers of one or more materials such as described above are configured to encompass and cover the extension of the stem rod 9. The extension of the stem rod 9 may be any shape and size which may be covered by an outer later or layers of one or more materials such as described above such that the sealing member 17 may be in communication with the valve body cavity 6.

In another embodiment, the sealing member 17 may be temporarily or permanently attached to the stem rod 9 through the use of the valve connectors 12 as shown in FIG. 3. In a further embodiment, the sealing member 17 may be temporarily or permanently attached to the valve head base 15 through the use of the valve connectors 12 as shown in FIG. 3. The core of the sealing member 17 may also be an extension of the valve head base 15 (not shown), such that an outer layer or layers of one or more materials of which the sealing member 17 is made is configured to encompass and cover the extension of the valve head base 9.

As briefly discussed above, the sealing member 17 may be chamfered or tapered as shown in FIGS. 3 and 5-8 such that the extreme end portion 17a of the sealing member 17 (adjacent away from the stem rod 9) is of a generally frusto-conical shape a smaller diameter than the portion 17b (also of a generally frusto-conical shape and generally co-axial with the portion 17a) of the sealing member 17 adjacent the stem rod 9. The sealing member 17 may be in communication with the valve body cavity 6 in such a way that a generally fluid-tight seal is created between the sealing member portions 17a and 17b and the valve body cavity 6, in order that the fluid in vat 24 may not pass through the valve body cavity 6 around the sealing member 17. Such a sealing position of the sealing member 17 is shown in FIG. 3. It is to be understood, however, that the present invention is not to be limited to the specific configuration of sealing member 17 as disclosed herein, and that a sealing member constructed in accordance with the present invention could take on a variety of other shapes and configurations if desired.

In one embodiment, the sealing member 17 is in communication with a valve seat element (not shown) within the valve body cavity 6 in such a way that a seal is created between the sealing member 17 and the valve seat element such that the material in the vat 24 may not pass through the valve body cavity 6 around the sealing member 17, where the sealing member 17 is in communication with the valve seat element. The valve seat element 17 may be made of the material or materials comprising the stem rod 9, the material or materials comprising the valve head base 15, the material or materials comprising the sealing member 17, the material or materials comprising the valve body 10, any other such material or combination of materials which would allow the sealing element 17 to seal against the valve seat element by virtue of the shape of the valve seat element, the material composition of the valve seat element, or a combination thereof. Examples of such materials include, but are not limited to, metals, polymers, elastomers and combinations thereof.

In one embodiment, the sealing member 17 is configured such that at least one recess 14 is present in the side of the sealing member 17 as shown in FIGS. 5-8. Such recess 14 may include a slot 14a for receiving a valve connector 12, such as a screw or bolt. Recess 14 would receive the head of such screw or bolt, and slot 14a would receive the shaft (which may be threaded, smooth, or some other profile). In such embodiment, the shaft of the screw or bolt would pass through a hole 15a in valve head base 15, and a nut (with or without one or more washers) would be used to threadingly engage a threaded portion of the screw or bolt to fix the sealing member 17 to valve head base 15. The recess 14 and slot 14a allow for such screw or bolt to be laterally inserted into and removed from sealing member 17 and thus allow sealing member 17 to be attached to valve head base 15 without penetrating or being exposed on the face 17c of sealing member 17. This allows face 17c to remain smooth and less prone to having food or other particles adhere thereto, thereby enhancing the sanitary operation and ability to clean sealing member 17. This arrangement also allows sealing member 17 to be readily removed from and attached to valve head base 15 for cleaning, replacement, repair and/or renewal.

In one embodiment, the valve head base 15 is configured such that at least one notch or groove (not shown) is present in the side of the valve head base 15. In another embodiment, the sealing member 17 and the valve head base 15 are configured such a notch or groove is present in the side of both the sealing member 17 and the valve head base 15 (not shown). In one aspect, the above notches or grooves may be offset. In another aspect, the above notches or grooves may be in line with each other.

The sealing member 17 may be manipulated by the stem manipulator 19 as shown in FIGS. 1-3. Manipulation of the sealing member 17 may cause the sealing member 17 to move within the valve body cavity 6 in such a way that the seal described above moves with the sealing member 17. The stem manipulator 19 may be, but is not limited to, a manual operation such as a knob, screw, handle, or other manual device which allows an operator or manually to move the position of the stem assembly 11 within the valve body cavity 6; an automatic operation through the use of a computer program controlling the position of the stem assembly 11 within the valve body cavity 6; an automatic operation through the use of a computer program controlling the position of the stem assembly 11 within the valve body cavity 6 in response to predetermined variables; any other suitable method of manipulating the stem assembly 11; or, any combination of the foregoing. In one embodiment, the stem manipulator 19 may be in communication with a series of valve assemblies 20, 22 such that the stem manipulator 19 may manipulate the stem assembly 11 of one or more valve assemblies 20, 22 at the same time, at different times, in certain groups, individually, in response to predetermined variables, or any combination thereof.

Turning back to the valve body 10, the valve body 10 may have one or more discharge elements 5 as shown in the FIGS. 1-5 which may allow the material in the vat 24 to be released when the sealing member 17 is manipulated such that the valve assembly 20, 22 is in the discharge position, as shown in FIG. 3. In one embodiment, the discharge element(s) 5 is an aperture in the valve body 10.

Figure 4:
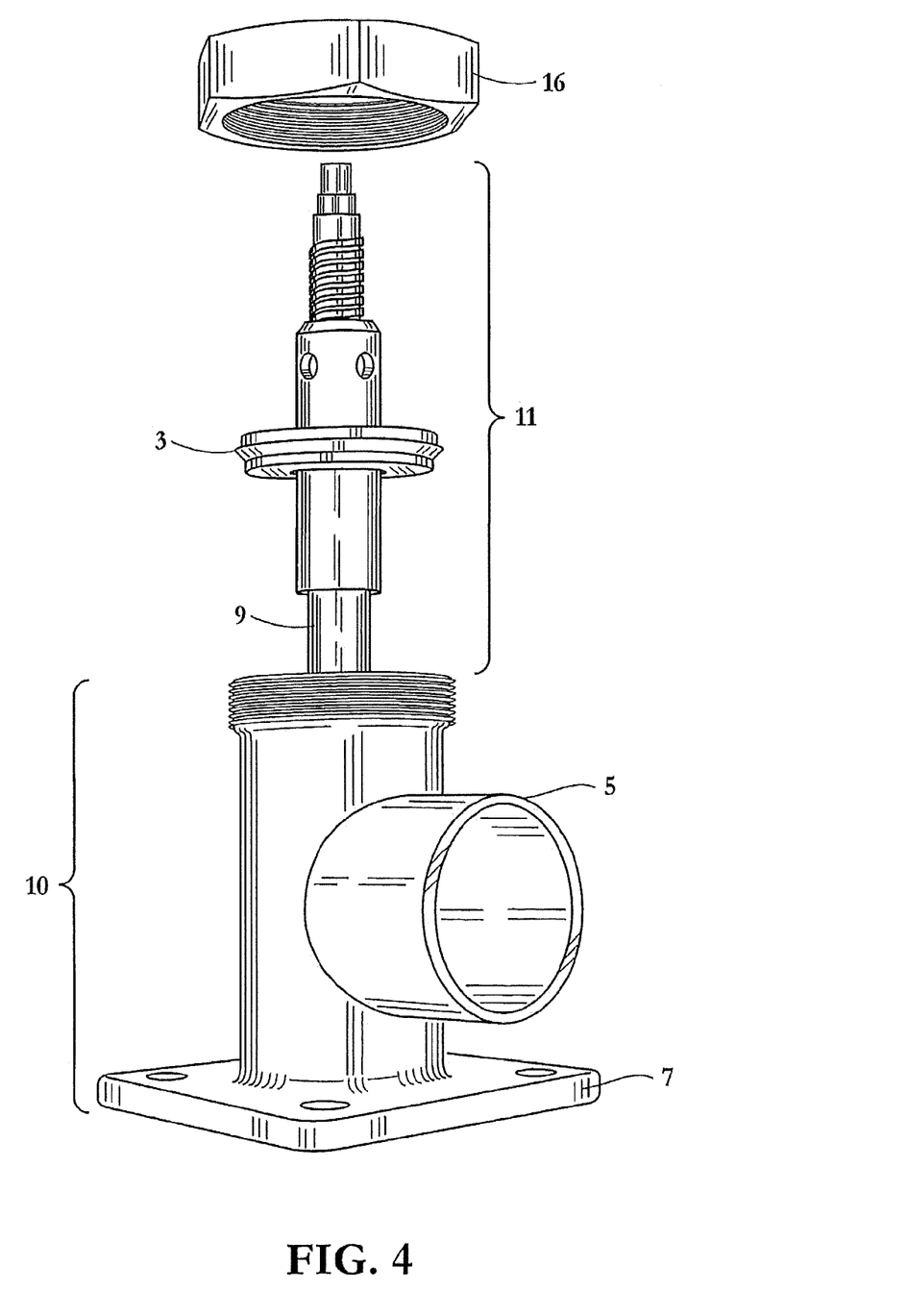
FIGS. 4 and 5 are exploded views of embodiments of valve systems constructed in accordance with the present invention.
Figure 5:
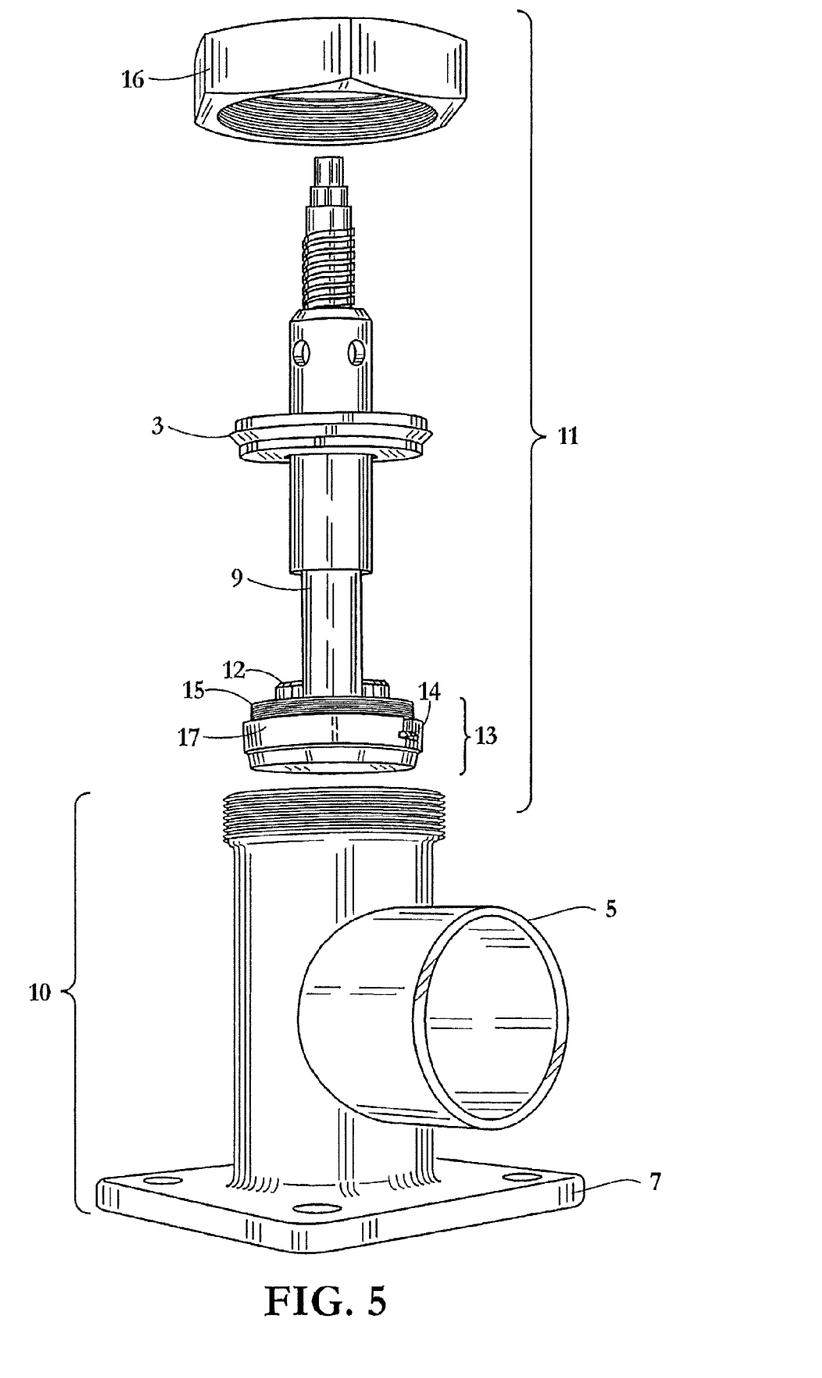
Figure 6:
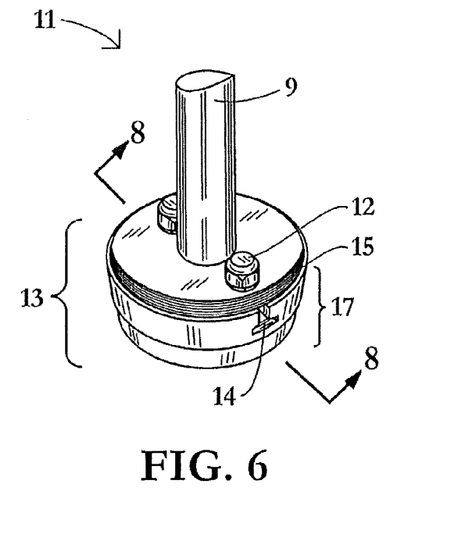
FIG. 6 is a perspective view, with parts cut away, illustrating one embodiment of a valve sealing member constructed in accordance with the present invention.
Figure 7:
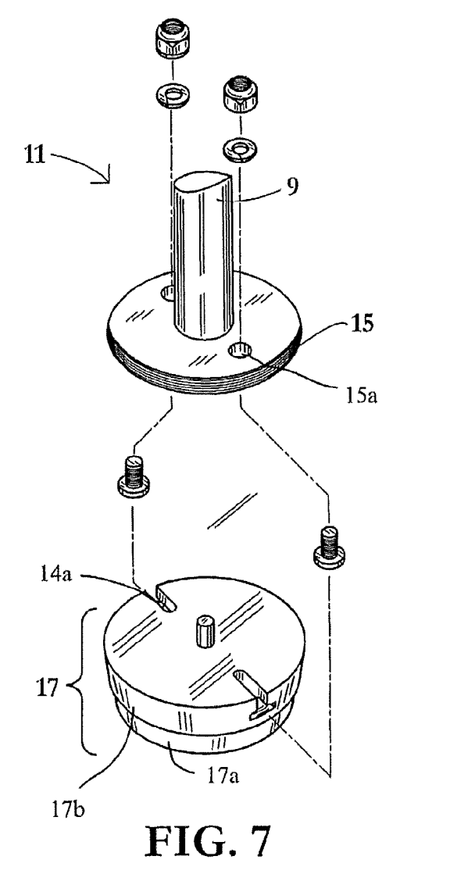
FIG. 7 is an exploded view of the embodiment shown in FIG. 6.
Figure 8:
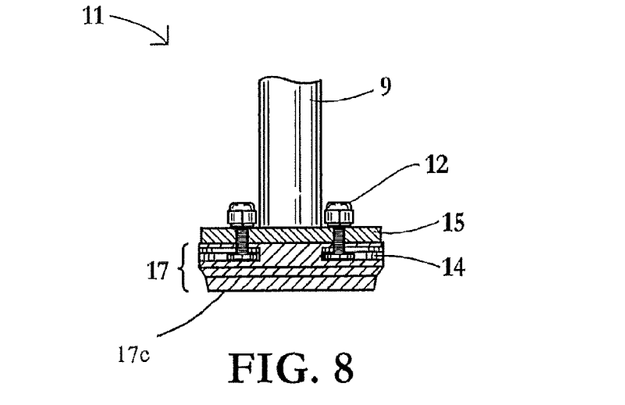
FIG. 8 is a sectional view taken along lines 8-8 of FIG. 6.

The valve assembly 20, 22 may additionally include a valve assembly flange 3 as shown in FIGS. 4 and 5. The valve assembly flange 3 may be made of the material or materials comprising the stem rod 9, the material or materials comprising the valve body cavity 6, the material or materials comprising the valve body base 7, any other such material or combination of materials demonstrating the characteristics, such as, but not limited to, resistance to the elements, necessary to the situation in which the valve assembly 20, 22 will be used, or any combination thereof. Examples of such materials include, but are not limited to, metals, polymers, and combinations thereof. In one aspect, the stem assembly 11 and valve assembly flange 3 may include a threaded means with which to insert the stem assembly 11 through the valve assembly flange 3 into the valve body cavity 6. In another embodiment, the valve assembly flange 3 may be incorporated into the stem assembly 11 such that the stem assembly 11 and the valve assembly flange 3 are one piece. In such an embodiment, the valve assembly flange 3 may be configured such that when the stem assembly 11 is inserted into the valve body cavity 6, the valve assembly flange 3 is substantially flush to the portion of the valve body cavity 6 the stem assembly 11 passed through to enter the valve body cavity 6. In one embodiment, the valve assembly flange 3 and the valve body cavity 6 create a seal such that the valve body cavity 6 is not in communication with the elements on the opposite side of the valve assembly flange 3.

In one embodiment, a stem assembly connector 16 may be used to connect the stem assembly 11 to the valve body 10. In one aspect, the stem assembly connector 16 may include a threaded ring, collar, nut, or the like such that the stem assembly connector 16 attaches to a threaded portion of the valve body 10 and contains the stem assembly 11 and/or the valve assembly flange 3. In such an aspect, the stem assembly connector 16 may create a seal such that the valve body cavity 6 is not in communication with the elements on the opposite side of the valve assembly flange 3. The stem assembly connector 15 may be made of the material or materials comprising the stem rod 9, the material or materials comprising the valve body 10, any other such material or combination of materials demonstrating the characteristics such as, but not limited to, resistance to the elements, necessary to the situation in which the valve assembly 20, 22 will be used, or any combination. Examples of such materials include, but are not limited to, metals, polymers, and combinations thereof.

Turning now to the operation of the valve assembly 20, 22, the valve assembly 20, 22 may be operated such that the seal assembly 11 is manipulated to move the sealing member 17 within the valve body cavity 6 from a sealed position as shown in FIG. 2 to an open, or discharge, position as shown in FIG. 3.

In one embodiment, the sealed position is the position in which the sealing member 17 is in communication with the valve seat element (not shown) such that a seal is created where the sealing member 17 abuts the valve seat element meet such that the material in the vat 24 may not pass through the valve body cavity 6. In another embodiment, the sealed position is the position in which the sealing member 17 is in communication with the valve body cavity 6 in such a way that a seal is formed where the sealing member 17 and the valve body cavity 6 meet such that the material in the vat 24 may not pass through the valve body cavity 6 around the sealing member 17 to reach the discharge element(s) 5.

In one embodiment, the discharge position is the position in which the sealing member 17 is no longer in communication with the valve seat element (not shown) such that the material in the vat 24 may pass through the valve body cavity 6 to the discharge element(s) 5 around the sealing member 17. In another embodiment, the discharge position is the position in which the sealing member 17 has been manipulated such that the material in the vat 24 may reach the discharge element(s) 5 through the valve body cavity 6 before the material reaches the sealing member 17. In one aspect of such an embodiment, material which is not discharged through the discharge element(s) 5 such that it reaches the sealing member 17 may not pass further through the valve body cavity 6 around the sealing member 17.

In one embodiment, the valve assembly 20, 22 may be manipulated such that the seal assembly 11 may be manipulated from the sealed position as shown in FIG. 2 to the discharge position as shown in FIG. 3 and from the discharge position to the sealed position. In one aspect, the valve assembly 20, 22 may be manipulated in this manner more than once. In another embodiment, the valve assembly 20, 22 may be manipulated such that the seal assembly 11 may be manipulated from the sealed position to the discharge position once.

Turning now to the assembly of the valve assembly 20, 22, the valve assembly 20, 22 is assembled such that the stem assembly 11 is in communication with the interior of the valve body cavity 6 and the stem assembly 11 is attached to the valve body cavity 6 in such a manner that the stem assembly 11 may be manipulated within the valve body cavity 6. The valve body assembly 20, 22 may additionally include a stem assembly connector 16 and/or a valve assembly flange 3 as described above.

An alternative embodiment of the invention is shown in FIGS. 10-13. Stem assembly 111 includes a valve sealing assembly, or valve head, 113 (FIG. 10) at the end of a stem rod, generally 109. The valve head 113 may be affixed to the stem rod 109 through the use of one or more valve connectors, generally 112.

The valve head 113 may include a valve head base 115 as shown in FIGS. 10-13. The valve head 113 may include a readily compressible sealing member 117. The sealing member 117 may generally be disc-shaped and may be made of nylon, polymers, or any other such material or combination of materials demonstrating the characteristics necessary to the situation in which the sealing member 117 is used. The sealing member 117 includes, in one embodiment, at least one readily compressible sealing ring, washer, or O-type ring 118. The sealing ring, washer, or O-type ring (hereinafter, "ring" or "sealing ring") 118 may be an elastomeric ring comprising natural rubber, some other elastomeric material, or a combination of same, or a non-elastomeric ring comprising Teflon, polypropylene, polyethylene, polystyrene, neoprene, copolymers, nylon or any combinations thereof, or combinations of same. With this embodiment, the ring 118 functions as a primary seal for essentially plugging the outlet opening (not shown) in the valve body cavity 6 such that the material in the vat 24 may not pass through the valve body cavity 6 around the sealing member 117. The sealing member 117 may also comprise a first portion 119 having a first diameter and a second portion 120 having a second diameter. Second portion 120 has a free end, or face, 121, and in one embodiment, includes a circumferentially extending chamfer (not shown) about the periphery of face 121.

In one aspect of the invention, the second diameter is less than the first diameter. In one embodiment, the sealing member 117 defines a circumferentially-extending groove 118a interposed between the first portion 119 and the second portion 120 that receives the sealing ring 118. In another aspect of the invention, the first portion may be of generally cylindrical or frusto-conical shape (not shown) and the second portion may be of generally cylindrical or frusto-conical shape (not shown) generally coaxial with the first portion (not shown).

Figure 10:
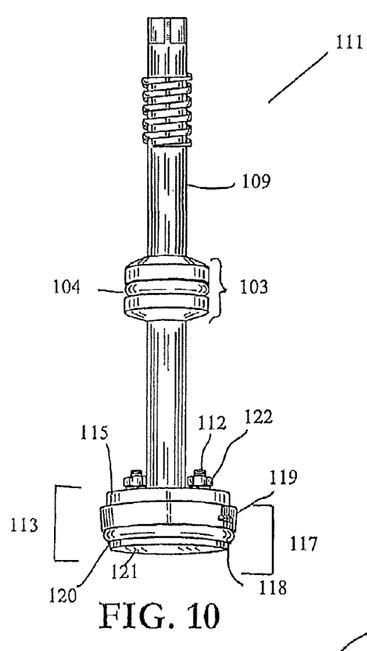
FIG. 10 is a perspective view of an embodiment of a valve system constructed in accordance with the present invention.
Figure 11:
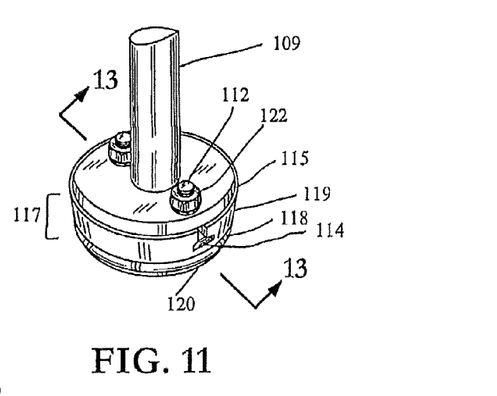
FIG. 11 is a perspective view, with parts cut away, illustrating one embodiment of a valve sealing member constructed in accordance with the present invention.
Figure 12:
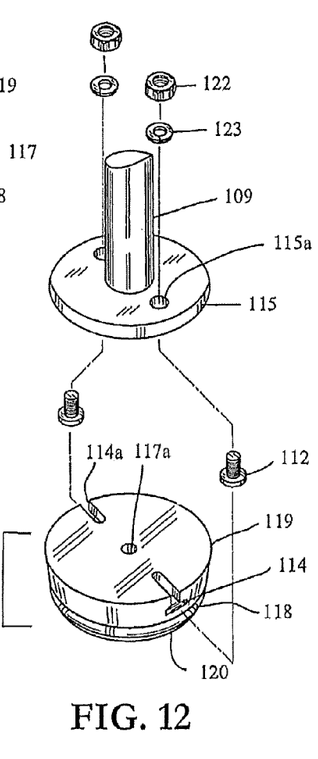
FIG. 12 is an exploded view of the embodiment shown in FIG. 11.
Figure 13:
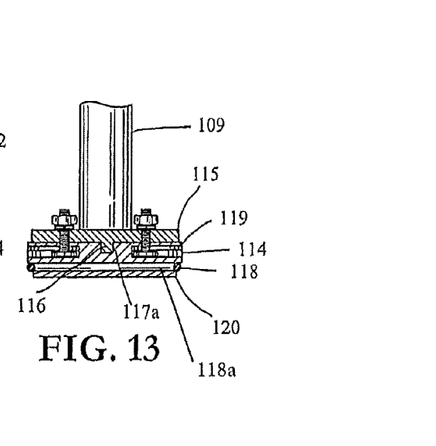
FIG. 13 is a sectional view taken along lines 13-13 of FIG. 11.

Stem assembly 111 may include valve stem 109 including a valve assembly flange 103 as shown in FIG. 10. The valve assembly flange 103 may include a flexible spacer or washer, O-type ring 104, or some other member, such as a flexible, eleastomeric, or resilient washer (not shown). The flexible spacer or washer, O-type ring 104 may be an elastomeric ring comprising natural rubber, some other elastomeric material, or a combination of same, or a non-elastomeric ring comprising Teflon, polypropylene, polyethylene, polystyrene, neoprene, copolymers, nylon or any combinations thereof, or combinations of same. The valve assembly flange 103 may be configured such that when the stem assembly 111 is inserted into the valve cavity 6, the valve assembly flange 103 is substantially flush to the portion of the valve body cavity 6, and the stem assembly 111 passes through to enter the valve body cavity 6. In one embodiment, the flexible spacer or washer, O-type ring 104 and the valve body cavity 6 create a seal such that the valve body cavity 6 is not in communication with the elements on the opposite side of the flexible spacer or washer, O-type ring 104.

In one embodiment, the sealing member 117 is configured such that at least one recess 114 is present in the side of the sealing member 117 as shown in FIGS. 10-13. Such recess 114 may include a slot 114a for receiving a valve connector 112, such as a screw or bolt. The recess 114 would receive the head of such screw or bolt, and slot 114a would receive the shaft (which may be threaded, smooth, or some other profile) of such screw or bolt. In such embodiment, the shaft of the screw or bolt would pass through a hole 115a in valve head base 115, and a nut 122 (with or without one or more washers 123) would be used to threadingly engage a threaded portion of the screw or bolt to fix the sealing member 117 to valve head base 115. The recess 114 and slot 114a allow for such screw or bolt to be laterally inserted into and removed from sealing member 117 and thus allow sealing member 117 to be attached to valve head base 115 without penetrating or being exposed on the face 121 of sealing member 117. This allows face 121 to remain smooth and less prone to having food or other particles adhere thereto, thereby enhancing the sanitary operation and ability to clean sealing member 117. This arrangement also allows sealing member 117 to be readily removed from and attached to valve head base 115 for cleaning, replacement, repair and/or renewal.

In one embodiment, the valve head base 115 is configured such that at least one notch or groove (not shown) is present in the side of the valve head base 115. In another embodiment, the sealing member 117 and the valve head base 115 are configured such a notch or groove is present in the side of both the sealing member 117 and the valve head base 115 (not shown). In one aspect, the above described notches or grooves may be offset. In another aspect, the above described notches or grooves may be in line with each other.

In one embodiment, the valve head base 115 is configured such that at least one protrusion 116 extends from the valve head base 115 and is adapted to fit into an aperture 117a in the sealing member 117. The protrusion 116 may be integrally formed with the valve head base 115, may be a separate unit attached to the valve head base 115, or a combination of same. The aperture 117a may extend into the first portion 119, through the first portion 119, through the first portion 119 and into the second portion 120, or through the first portion 119 and through the second portion 120 of the sealing member 117. The protrusion 116 and aperture 117a may be adapted to allow the valve head base 115 and the sealing member 117 to be contiguous.

Another alternative embodiment of the invention is shown in FIGS. 14-17. Stem assembly 211 includes a valve sealing assembly, or valve head, 213 (FIG. 14) at the end of a stem rod 209. The valve head 213 may include a valve head base 215 as shown in FIGS. 14-17. The valve head 213 may be integral with stem rod 209 or attached thereto by one or more threaded fasteners, such as screws, bolts, pins, weldment (none shown), or by some other suitable attachment manner.

The valve head 213 may include a readily compressible sealing member 217. The sealing member 217 may generally be disc-shaped and may be made of nylon, polymers, or any other such material or combination of materials demonstrating the characteristics necessary to the application in which the sealing member 217 is used. The sealing member 217 includes, in one embodiment, at least one readily compressible sealing ring, washer, or O-type ring 218. The sealing ring, washer, or O-type ring (hereinafter, "ring" or "sealing ring") 218 may be an elastomeric ring comprising natural rubber, some other elastomeric material, or a combination of same, or a non-elastomeric ring comprising Teflon, polypropylene, polyethylene, polystyrene, neoprene, copolymers, nylon or any combinations thereof, or combinations of same. With this embodiment, the ring 218 functions as a primary seal for essentially plugging the outlet opening (not shown) in the valve body cavity 6 such that the material in the vat 24 may not pass through the valve body cavity 6 around the sealing member 217. The sealing member 217 may also comprise a first portion 219 having a first diameter and a second portion 220 having a second diameter. Second portion 220 has a free end, or face, 221, and in one embodiment, includes a circumferentially extending chamfer about the periphery of face 221 (FIG. 14).

In one aspect of the invention, the second diameter is less than the first diameter. In one embodiment, the sealing member 217 defines a circumferentially-extending groove 218a interposed between the first portion 219 and the second portion 220 that receives the sealing ring 218. In another aspect of the invention, the first portion may be of generally cylindrical or frusto-conical shape (not shown) and the second portion may be of generally cylindrical or frusto-conical shape (not shown) generally coaxial with the first portion (not shown).

Figure 14:
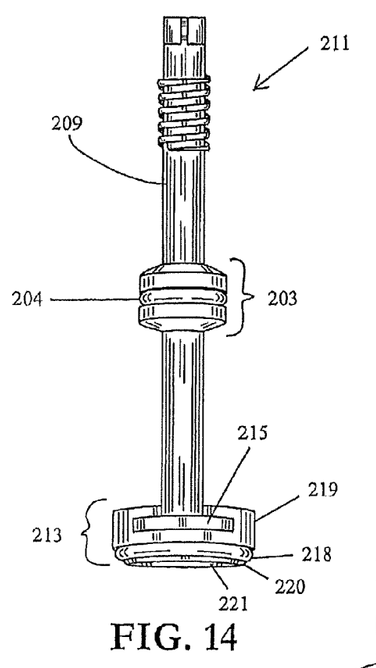
FIG. 14 is a perspective view of an embodiment of a valve system constructed in accordance with the present invention.
Figure 15:
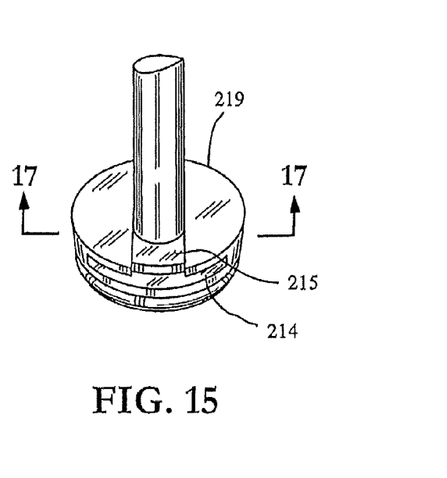
FIG. 15 is a perspective view, with parts cut away, illustrating one embodiment of a valve sealing member constructed in accordance with the present invention.
Figures 16, 17:
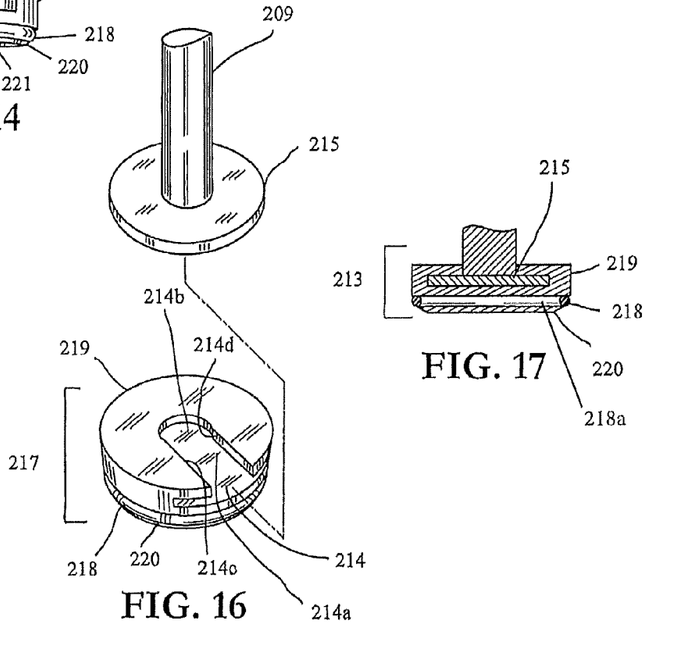
FIG. 16 is an exploded view of the embodiment shown in FIG. 15.
FIG. 17 is a sectional view taken along lines 17-17 of FIG. 15.

Stem assembly 211 may include valve stem 209 having a valve assembly flange 203 as shown in FIG. 14. The valve assembly flange 203 may include a flexible spacer or washer, O-type ring 204, or some other member, such as a flexible, elastomeric, or resilient washer (not shown). The flexible spacer or washer, O-type ring 204 may be an elastomeric ring comprising natural rubber, some other elastomeric material, or a combination of same, or a non-elastomeric ring comprising Teflon, polypropylene, polyethylene, polystyrene, neoprene, copolymers, nylon or any combinations thereof, or combinations of same. The valve assembly flange 203 may be configured such that when the stem assembly 211 is inserted into the valve body cavity 6, the valve assembly flange 203 is substantially flush to the portion of the valve body cavity 6, and the stem assembly 211 passes through to enter the valve body cavity 6. In one embodiment, the flexible spacer or washer, O-type ring 204 and the valve body cavity 6 create a seal such that the valve body cavity 6 is substantially blocked form communicating with the elements on the opposite side of the flexible spacer or washer, O-type ring 204.

In one embodiment, the sealing member 217 is configured such that at least one recess 214 is present in the side of the sealing member 217 as shown in FIGS. 14-17. Such recess 214 may include a slot 214a extending generally from adjacent the periphery of sealing member 217 to a center recess, or bore, 214b, for receiving the valve head base 215. The recess 214 is adapted to receive the valve head base 215, and slot 214a is adapted to receive the stem rod 209. In such an embodiment, the valve head base 215 would engage the sealing member 217 such that the sealing member 217 would be removably affixed to the valve head base 215. The slot 214a and center bore 214b may be adapted to locate the valve head base 215 at or about the center of the sealing member 217. In one aspect, the slot 214a and center bore 214b may be adapted to locate the valve head base 215 at a configuration other than at or about the center of the sealing member 217.

In one embodiment, the diameter of the center bore 214b may be larger than a first, or normal, width of the slot 214a such that the edge portions 214c and 214d defining slot 214a are spread apart slightly, causing the width of slot 214b to increase to a second, or expanded, width, as sealing member 217 is installed on stem rod 209 and valve head base 215. In such embodiment, stem rod 209 passes through the length of slot 214a, spreading edge portions 214c and 214d apart from one another and increasing slot 214a to its expanded width in so doing, and once stem rod 209 moves into center bore 214b, edge portions 214c and 214d snap back into their normal position, thereby narrowing slot 214a to substantially its relatively narrowed normal width. This narrowed normal width of slot 214a tends to cause stem rod 209 and base 215 to be retained in bore 214b in a snap-fit arrangement during normal operation. However, this snap-fit arrangement can be readily overcome to remove sealing member 217 from stem rod 209 by forcing stem rod 209 back into slot 214a, spreading edge portions 214c and 214d apart form one another in so doing, and moving sealing member 217 and stem rod 209 relative to one another until stem rod 209 clears slot 214 adjacent the periphery of sealing member 217.

In another embodiment, the recess 214 may be adapted to be deeper than the depth of the valve head base 215. In such an embodiment, the sealing member 217 is able to move vertically or horizontally in relation to the valve head base 215 without significantly affecting the position of the valve head base 215 and the valve head base 215 is able to move and/or rotate in relation to the sealing member 217 without significantly affecting the position of the sealing member 217. Such an embodiment allows the sealing member 217 to center inside the valve body cavity 6 (see FIG. 2) and for the stem rod 209 to be rotated without significantly affecting the sealing member's position inside the outlet opening. In another embodiment, the recess 214 is adapted to be the same or substantially the same depth of the valve head base 215. In such an embodiment, there is little or no movement of the sealing member 217 or the stem rod 209 that does not affect the position of the other element.

The recess 214 and slot 214a allow for the valve head base 215 to be laterally inserted into and removed from sealing member 217 and thus allow sealing member 217 to be attached to valve head base 215 without penetrating or being exposed on the face 221 of sealing member 217. This allows face 221 to remain smooth and less prone to having food or other particles adhere thereto, thereby enhancing the sanitary operation and ability to readily remove and clean sealing member 217. This arrangement also allows sealing member 217 to be readily removed from and attached to valve head base 215 for cleaning, replacement, repair and/or renewal.

Certain modifications and improvements will occur to those skilled in the art upon a reading of the foregoing description. All such modifications and improvements of the present invention have been deleted herein for the sake of conciseness and readability.

While typical aspects of embodiment and/or embodiments have been set forth for the purpose of illustration, the foregoing description and the accompanying drawings should not be deemed to be a limitation on the scope of the invention. Accordingly, various modifications, adaptations, and alternatives may occur to one skilled in the art without departing from the spirit and scope of the present invention. Numerous other aspects of embodiments, embodiments, features, and advantages of the present invention will appear from the description and the accompanying drawings. In the description and/or the accompanying drawings, reference is made to exemplary aspects of embodiments and/or embodiments of the invention, which can be applied individually or combined in any way with each other.

What is claimed is:

1. A vat for holding a substance, comprising:
a chamber that receives the substance; and
a valve assembly having an outlet in fluid communication with the chamber;
said valve assembly including a valve body and a stem;
said stem including a valve head having a sealing member connected thereto;
said sealing member including at least one radially compressible sealing ring, a generally cylindrical first portion, and a generally cylindrical second portion coaxial with the first portion, the first portion having a first diameter and the second portion having a second diameter, wherein said second diameter is less than said first diameter, wherein the second portion has a free end with a generally smooth face, and wherein the sealing ring is disposed in a circumferentially-extending groove defined between the first portion and the second portion;
said sealing member being in fluid communication with the outlet and said chamber and selectively operable between a discharge position, for allowing the substance to drain from said chamber, and a closed position, for allowing the substance to remain in the chamber;
said sealing member being comprised of one or more polymers;
a valve head base that engages said sealing member; and
said sealing member defining a recess for the lateral receipt of said valve head base;
wherein said valve head base is adapted to rotate in relation to said sealing member without significantly affecting the position of said sealing member, and wherein said sealing member is adapted to move laterally relative to said valve head base without significantly affecting the position of said valve head base.

2. The vat according to claim 1, further comprising a passage in communication with said recess for receipt of said stem.

3. The vat according to claim 1, wherein the sealing ring comprises an elastomeric material and the first and second portions comprise nylon.

4. The vat according to claim 1, wherein the sealing member is adapted to move vertically or horizontally relative to said valve head base without significantly affecting the position of said valve head base.

* * * * *